Figure 1:
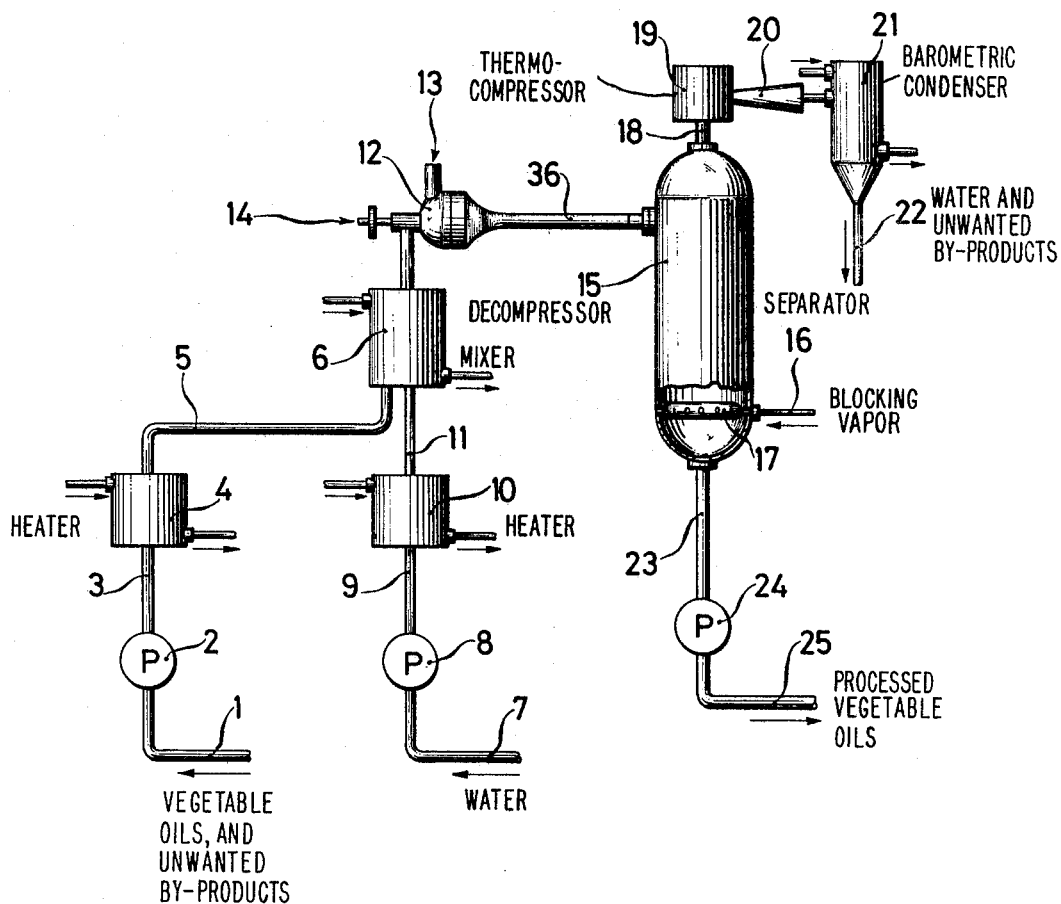

United States Patent [19]

Schumacher

[11] 4,094,748
[45] June 13, 1978

[54] METHOD OF AND DEVICE FOR DISTILLING OFF SECONDARY SUBSTANCES FROM OILY LIQUIDS

[76] Inventor: Heinz Schumacher, Hoperfeld 26, D-2050, Hamburg 80, Germany

[21] Appl. No.: 695,502

[22] Filed: Jun. 11, 1976

[30] Foreign Application Priority Data

Jun. 16, 1975  Germany .............. 2526944

[51] Int. Cl.² .......... B01D 3/06; B01D 3/38; C11B 3/14
[52] U.S. Cl. ..................... 203/88; 203/92; 203/DIG. 14; 202/177; 202/205; 202/234; 260/428
[58] Field of Search .......... 203/88, DIG. 14, 26, 203/24, 91, 92, 93, 95–97, 49, 76, 79, 78, 83, 85; 260/428; 202/205, 234, 177

[56] References Cited

U.S. PATENT DOCUMENTS

| | | | |
|---|---|---|---|
| 1,871,051 | 8/1932 | Franzen | 203/92 |
| 2,461,694 | 2/1949 | McCuhbin et al. | 203/78 |
| 2,478,089 | 8/1949 | Clayton | 203/92 |
| 2,627,500 | 2/1953 | Potts et al. | 203/78 |
| 2,674,570 | 4/1954 | Potts | 203/79 |
| 3,409,515 | 11/1968 | Baird et al. | 203/92 |
| 3,470,070 | 9/1969 | Heckart | 203/88 |
| 3,505,176 | 4/1970 | Buschbaum | 203/DIG. 14 |

FOREIGN PATENT DOCUMENTS

457,624  12/1936  United Kingdom .......... 203/88

Primary Examiner—Wilbur L. Bascomb, Jr.
Attorney, Agent, or Firm—J. Rodman Steele, Jr.

[57] ABSTRACT

Impurities or unwanted by-products are distilled off from an oily liquid by means of an ancillary stripping agent. The vaporization temperatures of the impurities and of the ancillary stripping agent lie below that of the oily liquid. Spontaneous distillation takes place in a decompressor to which the materials to be treated are supplied from a mixer or contactor. The decompressor comprises two nozzles arranged in series. In the decompressor the materials to be treated are subjected to a pressure considerably below the mixer pressure and somewhat below the separator pressure. Decomposition of the oil stream occurs in the decompressor into a non-volatile liquid phase and a vapor phase containing the ancillary stripping agent and the impurities originally in the oil feed. The mixed vapor/liquid stream enters the separator which is at a pressure which lies considerably below the pressure obtaining in the mixer.

9 Claims, 2 Drawing Figures

METHOD OF AND DEVICE FOR DISTILLING OFF SECONDARY SUBSTANCES FROM OILY LIQUIDS

This invention relates to a method of and a device for distilling off, or stripping, impurities or unwanted by-products from oily liquids, in particular by means of an ancillary stripping agent, the vapourization points or boiling temperatures of the impurities and of the ancillary stripping agent lying below that of the oily liquid, by spontaneous distilling off in a decompressor.

Such a method together with the apparatus for carrying out the method is described in German Patent Applications Nos. P 24 33 733.5 and P 25 25 976.1-43 which relate essentially to the processes in the mixer or contactor itself, in which the ancillary stripping agent, i.e water or steam condensed to water, was to be intimately mixed with oil. In order to ensure satisfactory solution at the molecular level, high pressures, e.g. 45 to 50, atm (662 to 735 pounds per square inch (psi)), were used in the mixer itself. This was followed by rapid or shock decompression in the decompressor, the initial pressure of which was the same as in the separator vessel. The stated pressure of 1 to 30 Torr (0.02 to 0.58 psi) was obtained by a suction device, i.e. a thermo-compressor, acting upon the separator. This thermo-compressor comprises two stages, each stage consisting of a nozzle and an expansion section, disposed behind each other along the axis of flow. Between the two stages, an annular zone is provided for the disengagement of vapor and volatized impurities from the decompressed oil which is maintained at a subatmospheric pressure. The thermocompressor is designed to operate over a wide range of pressure differentials because of provisions for an adjustable orifice in the first nozzle and option to use, or not to use, auxillary motive steam.

The flow rate of the steam through the first nozzle governs not only the pressure in the low-pressure chamber but also the suction rate of the auxiliary stripping agent and the impurities, and thus also the pressure in the separator and in the supply line thereof up to a decompression (pressure release) valve after the mixer or contactor.

The impurities or unwanted by-products carried by the steam and the auxiliary stripping agent, mostly steam, are eventually caused to condense after they have passed through the two nozzles into a condenser provided with a pressure gauge.

Such a suction device is therefore, unsatisfactory because the thermocompressor consumes large amounts of steam. A pressure of 1.5 to 8 Torr (0.03 - 0.15 psi) usually prevails within the separator in installations used at present. However, in order to maintain a pressure of for example 2.5 Torr (0.05 psi) in the separator, about 300 Kg of steam per ton of oil to be treated are to be supplied.

Such a supply, however, is necessary in the case of known deodorizers, e.g. as disclosed in the German Specification No. 2,442,217, generally to ensure the decompression after, or even in, the contactor, thereby producing a low pressure for stripping off the impurities. An accurate rapid and spontaneous decompression was possible in the first place when supplying an installation as described in the German Patent Application Nos. P 24 33 733.5 and P.25 25 976.1-43. Spontaneous decompression is produced in this case by considerable pressure drop as compared with the known installation and it is an object of the present invention to take greater advantage of the pressure drop.

The present invention in one aspect provides a method of distilling off impurities from an oily liquid by means of an ancillary stripping agent, the boiling points of the impurities and of the ancillary stripping agent lying below that of the oily liquid, by spontaneous distilling off in a decompressor to which the materials to be treated are supplied from a mixer or contactor, and from which the oily liquid in the liquid phase and the ancillary stripping agent and the impurities in the gaseous phase, having absorbed the heat required to vapourise them from the liquid phase, enter a separator vessel under a separation pressure which lies considerably below the pressure obtaining in the contactor, where in their passage through the decompressor the materials to be treated are subjected to a pressure lower than that in the separator because of the decompressor construction.

The invention in another aspect provides a device for carrying out the method according to the invention, wherein the decompressor comprises two nozzles arranged in series.

Thus a thermo-compressor unit with a double nozzle is placed after the contactor vessel. This, however, was not possible unless a large drop in pressure was available after the contactor itself. It was further established that suitable redesigned or adjusted thermo-compressor units, when inserted at this point, showed a further improvement in spontaneous decompression, which was finally measured on the basis of the degree of purity of the refined oily liquids. This unexpected effect occurred in addition to the desired one, namely the reduction in size or the like elimination, suitably designed installations of the vacuum device in usually a thermo-compressor, on or after the final separator. The total saving of steam may be 80% or more.

Further improvements can be effected by introducing additional ancillary stripping agent into the decompressor itself, whereby the pressure can be reduced even more in the direction of flow, so that an even higher degree of purification can be achieved of the material under treatment. It is therefore now possible, by making use of the method according to the invention, to carry out stripping operations that were quite impracticable with conventional equipment, because the final separation was not complete enough.

Figure 2:
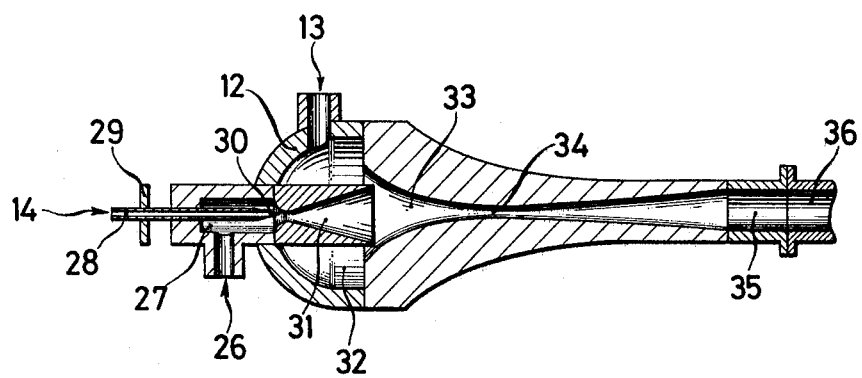

The invention will be further described, by way of example only, with reference to the accompanying drawings, in which:

FIG. 1 is a schematic side view, partly cut away, of a stripping installation; and FIG. 2 is an axial section through the decompressor of the stripping installation shown in FIG. 1.

FIG. 1 shows an inlet 1 of a pipe for material to be treated, e.g. a vegetable oil such as soya oil. A transfer to pressurizing pump 2 which raises the material to the desired pressure, and from there the material then flows through a pipe 3 into a heater 4, and thence through pipe 5 into a contactor or mixer vessel 6. At the point of entry into the contactor vessel 6, the temperature and pressure of the feed material is such that upon mixing with the ancillary stripping agent, e.g. steam, the mixture shall be at approximately 242° C (468° F) and 48 atm (706 psi). The ancillary stripping agent enters the system through an inlet pipe 7; is compressed in a pressurizing pump 8; is heated in heater 10; and is finally injected into the contactor 6 through pipe 11. At the exit of the mixer, at inlet 26, all components are in the liquid phase.

The liquid phase mixture from the contactor 6 enters a decompression device 12 in which separation of the impurities and ancillary agent, i.e., steam from the oily liquid product occurs. The two phases flow concurrently through pipe 36 to separator 15, wherein phase separation takes place with the steam and impurities leaving through pipe 18 and the purified oily liquid leaving through pipe 23. Because of its subatmospheric pressure, the oil in pipe 23 must be pressurized by pump 24 back up to atmospheric pressure so it can be removed from the system through pipe outlet 25. In order to prevent reabsorption of impurities by the oil, additional ancillary stripping agent, e.g. steam, can be introduced through pipe 16 and sparger 17. These vapors also leave through pipe 18.

Depending on system requirements an additional vacuum source can be provided by means of a thermocompressor 19 which exhausts through pipe 20 to barometric condensor 21. The condensed vapors, impurities and condensed water, leave the system through pipe 22.

The decompressor 12 is shown in detail in FIG. 2. The liquid mixture enters through an inlet 26 into an antechamber 27 preceding a first nozzle 31. The orifice of this nozzle 31 can be axially adjusted by means of a canula needle 28, which may be provided with a hand wheel 29.

While the temperature in the chamber 27 may still be 242° C with a pressure of 48 to 50 atm (706 to 735 psi) flow through the orifice throat causes decompression of the fluid at .33 with consequent stripping at a pressure of about 1 to 30 Torr (0.02 to 0.58 psi) the liquid material being chilled by about 20° C (68° F) to about 220° C (428° F). The energy for the vaporization of the volatile impurities and the stripping agent (steam) is supplied by the non-volatile oil stream, i.e. the treated material. The point 33 lies in a low-pressure chamber 32, from which the ancillary stripping agent, once again converted to vapour, i.e., water reconverted to steam, and the volatile impurities, entrained in gaseous form by the steam and the oily phase venturi, flow through a second nozzle 34 to the exhaust section 35 which is connected to pipe 36. The pressure in this pipe may be 24 Torr (0.46 psi), if the pressure in the chamber 32 is about 1.2 Torr (0.02 psi).

In order further to reduce the pressure in the chamber 32, additional stripping agents, e.g. steam, may be introduced through inlets 13 and/or 14, the steam supplied through the inlet 14, travels through the canula needle 28, exits through an axial orifice 30, and increases the pressure difference between antechamber 27 and chamber 32, while the steam introduced through inlet 13 will always pass directly into the chamber 32.

If the pressure in the separator 15 or in pipe 36 is for example 30 Torr (0.58 psi) it is possible to achieve a pressure reduction to 1 to 2 Torr (0.02 to 0.04 psi) in the chamber 32 by introducing ancillary stripping agents through the inlets 13 and 14; if the pressure in the pipe 36 is for example .2 Torr (0.02 psi), then a pressure reduction to 0.2 to 0.4 Torr (0.004 to 0.008 psi) becomes readily attainable in the chamber 32.

Both the nozzles 31 and 34 may have the form of a venturi nozzle, in which case the minimum diameter of the nozzle 31 must be such as to make it possible to establish the desired pressure of, for example, 48 to 50 atm (706 to 735 psi) in the contactor 6.

An example of the method according to the invention, which operates completely without a thermo-compressor 19, presented the following data: The throughput quantity of vegetable oil was 10 tons/hr. The mixing temperature in the contactor was (468° F) and the pressure was 50 atm (735 psi). Steam was used as the ancillary stripping agent and was completely dissolved in quantities of 200 kg/hr in the vegetable oil. About 100 kg/hr. of additional steam was introduced through each of the inlets 13 and 14. The injection of stripping steam through the inlet 16 was likewise 100 kg/hr, so that 500 kg/hr was supplied in all. The temperature of the vegetable oil in the pipe 36 was 220° C (428° F), and that of the gases in the pipe 18 was about 160° C (320° F).

The content of impurities or unwanted by-products, e.g. free fatty acids, in the material to be treated amounted at the inlet 1 was some 1.2%, reckoned as oleic acid, and in the oil at the outlet 25 impurities were 0.01%. The pressure between the two nozzles 31 and 34, measured at about the point 33, was 1.5 Torr (0.03 psi), and the separation pressure in the separator 15 was about 30 Torr (0.58 psi). This pressure of 30 Torr (0.58 psi) corresponds to a coolant water temperature of 30° C (86° F), which is readily attainable by means of recirculating water cooling towers. For every 10 tons of material to be treated, a total of 500 kg/hr of ancillary stripping agent, in this example steam, was introduced, whereas for the same 10 tons of material 3.1 tons of steam were supplied in conventional deodorizers, of which 3 tons were in the thermo-compressor 19 alone. Moreover, the purification of the material was considerably improved by using the method according to the invention.

Consequently, a daily output of 250 tons of oil has hitherto required about 75 tons of steam whereas, now, by using the method according to the invention, not more than 12.5 tons per day need be used.

I claim:

1. A method of distilling off unwanted by-products from an oily liquid by means of steam, the vaporization points of the by-products and of the steam lying below that of the oily liquid, comprising:

heating and pressurizing said oily liquid and said steam;

mixing said oily liquid and said steam in a contactor;

spontaneously decompressing said mixture in a decompressor to a pressure considerably below the pressure in said contactor, causing said mixture to decompose into a purified liquid phase of said oil and a vapor phase of said steam and said by-products, said steam and said by-products having absorbed their heats of vaporization from the heat of the oily liquid; and separating said vapor from said purified liquid in a separator under a separation pressure which lies considerably below the pressure obtaining in the contactor.

2. The method of claim 1, wherein the decompression pressure is about one twentieth of the separation pressure.

3. The method of claim 1, wherein the decompression pressure is lowered still further by introducing additional steam into the decompressor.

4. The method of claim 1, wherein the oily liquid is a vegetable oil.

5. The method of claim 4, wherein the oily liquid is soya oil.

6. An apparatus for distilling off unwanted by-products from an oily liquid by means of steam, the vaporization points of the unwanted by-products and of the steam lying below that of the oily liquid, comprising:
- respective means for pressurizing and heating said oily liquid;
- respective means for pressurizing and heating said steam;
- a contactor for mixing said oily liquid and said steam;
- means for feeding said oily liquid and said steam from their respective pressurizing and heating means to said contactor;
- a decompressor for spontaneously decompressing said mixture to a pressure considerably below the pressure in said contactor, causing said mixture to decompose into a purified liquid phase of oil and a vapor phase of said steam and said by-products, said steam and said by-products having absorbed their heats of vaporization from the heat of the oily liquid, said decompressor having first and second nozzles arranged in series, whereby the mixture is subjected to a decompression pressure which lies considerably below the pressure in said contactor;
- means for feeding said mixture from said contactor into said decompressor;
- means for separating said vapor from said purified liquid, said separating means operating at a pressure considerably below the pressure in said contactor; and,
- means for feeding said vapor and said purified liquid from said decompressor into said separating means.

7. The apparatus of claim 6, where in the decompressor the first nozzle following the contactor is adjustable.

8. The apparatus of claim 7, wherein the decompressor further comprises an axially slidable canula needle through which additional steam can be introduced into the first nozzle.

9. The apparatus of claim 6, wherein said decompressor further comprises a first decompression chamber following the first nozzle and means for introducing additional steam into said decompressor after the first and before the second nozzle.

* * * * *